US008519991B2

(12) United States Patent
Mizoguchi

(10) Patent No.: US 8,519,991 B2
(45) Date of Patent: Aug. 27, 2013

(54) IMAGE DISPLAY APPARATUS AND CONTROL METHOD THEREOF FOR CONTROLLING BRIGHTNESS UNEVENNESS DUE TO RESISTANCE OF COLUMN WIRINGS

(75) Inventor: Masahiko Mizoguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 13/237,391

(22) Filed: Sep. 20, 2011

(65) Prior Publication Data

US 2012/0098801 A1 Apr. 26, 2012

(30) Foreign Application Priority Data

Oct. 20, 2010 (JP) ................................ 2010-235521

(51) Int. Cl.
*G06F 3/038* (2013.01)

(52) U.S. Cl.
USPC ........................................................ 345/204

(58) Field of Classification Search
None
See application file for complete search history.

(56) References Cited

U.S. PATENT DOCUMENTS 6,097,356 A 8/2000 Fan
6,831,620 B1 * 12/2004 Nishikubo et al. .............. 345/87
7,760,180 B2 7/2010 Shimatani

FOREIGN PATENT DOCUMENTS

JP 06-258614 A 9/1994

* cited by examiner

*Primary Examiner* — David D Davis
(74) *Attorney, Agent, or Firm* — Fitzpatrick, Cella, Harper & Scinto

(57) ABSTRACT

An image display apparatus according to the present invention comprises a display panel having a plurality of row wirings, a plurality of column wirings, and a plurality of pixels, a row wiring driving circuit which sequentially selects the row wirings and outputs a scanning signal to the selected row wiring, a column wiring driving circuit which outputs a modulation signal generated based on image data to the plurality of column wirings, in synchronization with the output of the scanning signal, and a variable resistance circuit which dynamically changes resistance values between the column wiring driving circuit and the column wirings, wherein the variable resistance circuit changes the resistance values according to a position of the selected row wiring so that the resistance value becomes higher as the selected row wiring is closer to the column wiring driving circuit.

8 Claims, 13 Drawing Sheets

IMAGE DISPLAY APPARATUS AND CONTROL METHOD THEREOF FOR CONTROLLING BRIGHTNESS UNEVENNESS DUE TO RESISTANCE OF COLUMN WIRINGS

BACKGROUND OF THE INVENTION

1. Field of the Invention

The present invention relates to an image display apparatus and a control method thereof.

2. Description of the Related Art

As a flat panel display (FPD), a liquid crystal display (LCD), plasma display (PDP), organic EL display (OLED) and field emission display (FED) among others are known.

FED having a passive matrix structure in particular has characteristics of low cost and high-speed response, because it has a simple panel structure where a field emitting device is positioned at an intersection of a row wiring and a column wiring.

FIG. 1 is a diagram depicting a basic configuration example of a general matrix driving type image display apparatus (e.g. FED). A plurality of column wirings 104 and a plurality of row wirings 105 are formed on the rear substrate 106, and a pixel (display device) is formed on each intersection of a column wiring 104 and a row wiring 105. A display apparatus module is constructed by the column wirings 104 connected to a column wiring driving circuit 102 and the row wirings 105 connected to a row wiring driving circuit 103.

The image display apparatus in FIG. 1 also has a control circuit 101 to which digital image signals are input. The row wiring driving circuit 103 is a circuit that applies a scanning signal (selection voltage) to a driving target row wirings 105 and an unselection voltage to the other row wirings 105. Row wirings 105 are sequentially driven (scanned) one line at a time from the top, for example. The column wiring driving circuit 102 generates a driving waveform (modulation signal) of each column based on an image signal (brightness signal) of a driving row, and applies the driving waveform to each column wiring 104. Thereby a brightness of the display device (electron emitting amount of the electron emitting device) is modulated, and a desired image can be output.

However because of the wiring resistance of the column wirings 104 and the electrostatic capacitance generated at the intersections of the column wirings 104 and row wirings 105, voltage of the modulation signals drops, and the waveform is rounded by the RC time constant. Due to this, as shown in FIG. 12 the form of a modulation signal to be applied to a display device disposed close to the column wiring driving circuit 102 (driving end side) and that to be applied to a display device disposed distant from the column wiring driving circuit 102 (open end side) become different. As a result, the open end side becomes darker than the driving end side. In other words, brightness unevenness (display failure) is generated in the column direction.

Furthermore, a column wiring 104 becomes longer and thinner as the size of the image display apparatus becomes larger, and the resolution thereof becomes higher. Since this increases the resistance of the column wirings 104, brightness unevenness increases even more than the above mentioned case.

The proposed technologies for solving this problem are, for example, a technology for correcting image signals using correction values according to the position of the display device and gradation (U.S. Pat. No. 6,097,356), and a technology for correcting the image signals according to rounding of the voltage signal due to the RC time constant (Japanese Patent Application Laid-Open No. H6-258614). If these technologies are used, the above mentioned display failure can be controlled (corrected).

SUMMARY OF THE INVENTION

In the case of the technologies disclosed in U.S. Pat. No. 6,097,356 and Japanese Patent Application Laid-Open No. H6-258614, brightness unevenness depending on the position of the display devices can be decreased, but a drop in gradation of an image or an increase in circuit scale is inevitable.

FIG. 2A and FIG. 2B show an example of the respective change of brightness when a value of a modulation signal to be applied to display devices on the driving end side and on the open end side of the column wiring driving circuit 102 is changed from the gradation value 0 (minimum value of the modulation signal) to the maximum gradation value (gradation value Dmax; maximum value of the modulation signal). As FIG. 2A and FIG. 2B show, if the maximum brightness of the display devices on the driving end side (neighborhood maximum brightness) is brightness La, then the maximum brightness of the display devices on the open end side (remote maximum brightness) is brightness Lb, which is lower than the brightness La. This is because in the open end side, brightness drops more than the driving end side, since a signal level drop, due to a voltage drop of the modulation signal, is generated more for the amount of the resistance of the column wirings, and the waveform is rounded more due to the RC time constant.

According to the prior art, in order to control brightness unevenness, the brightness of the display device, of which maximum brightness is high, is matched to the brightness of the display device, of which maximum brightness is low. In concrete terms, the maximum brightness of display devices on the driving end side is set to the brightness Lb, and only modulation signals up to the gradation values Da (gradation values lower than the gradation value Dmax; neighborhood maximum gradation) are used for the display devices on the driving end side. Therefore the gradation of an image generated by the display devices on the driving end side drops, and the neighborhood maximum gradation value becomes lower than the maximum gradation value of display devices on the open end side (remote maximum gradation).

In order to maintain high gradation of an image, the number of bits of the image signal must be higher considering the above mentioned drop in gradation of an image. This however increases the scale of a circuit, such as the control circuit and the driving circuit, and increases the data volume of image signals.

The present invention provides a technology which can control brightness unevenness due to the wiring resistance of the column wirings without decreasing the gradation of an image, using a simple configuration. The present invention in its first aspect provides an image display apparatus, which comprises a display panel having a plurality of row wirings, a plurality of column wirings, and a plurality of pixels disposed on each intersection of the row wirings and the column wirings. It also comprises a row wiring driving circuit which sequentially selects the row wirings and outputs a scanning signal to the selected row wiring. In addition, it comprises a column wiring driving circuit which outputs a modulation signal generated based on image data to the plurality of column wirings, in synchronization with the output of the scanning signal. Finally, it comprises a variable resistance circuit which dynamically changes resistance values between the column wiring driving circuit and the column wirings. Specifically, the variable resistance circuit changes the resistance values according to a position of the selected row wiring so that the resistance value becomes higher as the selected row wiring is closer to the column wiring driving circuit.

The present invention in its second aspect provides a method for controlling an image display apparatus having a display panel having a plurality of row wirings, a plurality of column wirings, a plurality of pixels disposed on each intersection of the row wirings and the column wirings, a row wiring driving circuit, a column driving circuit, and a variable resistance circuit. The method comprises a step in which the row wiring driving circuit sequentially selects the row wirings and outputs a scanning signal to the selected row wiring. It also comprises a step in which the column wiring driving circuit outputs a modulation signal generated based on image data to the plurality of column wirings, in synchronization with the output of the scanning signal. In addition, it comprises a step in which the variable resistance circuit dynamically changes resistance values between the column wiring driving circuit and the column wirings according to a position of the selected row wiring, so that the resistance value becomes higher as the selected row wiring is closer to the column wiring driving circuit.

According to the present invention, brightness unevenness due to the wiring resistance of the column wirings can be controlled without decreasing gradation of an image, using a simple configuration.

Further features of the present invention will become apparent from the following description of exemplary embodiments with reference to the attached drawings.

DESCRIPTION OF THE EMBODIMENTS

Embodiments of the present invention will now be described with reference to the drawings. The present invention relates to a technology for correcting brightness unevenness (brightness unevenness caused by a voltage drop due to the wiring resistance of the column wirings and rounding of waveforms due to RC time constant), which is caused by the wiring resistance of the column wirings in the matrix driving type display panels. In the following description on the embodiment, a case of applying the present invention to a display apparatus (FED) using field emitting devices (electron emitting devices) as pixels (display devices) will be described. The applicable range of the present invention, however, is not limited to this, but can be applied to image display apparatuses other than FED, only if the image display apparatus has a matrix driving type display panel.

(General Configuration of Image Display Apparatus)

Figure 1:
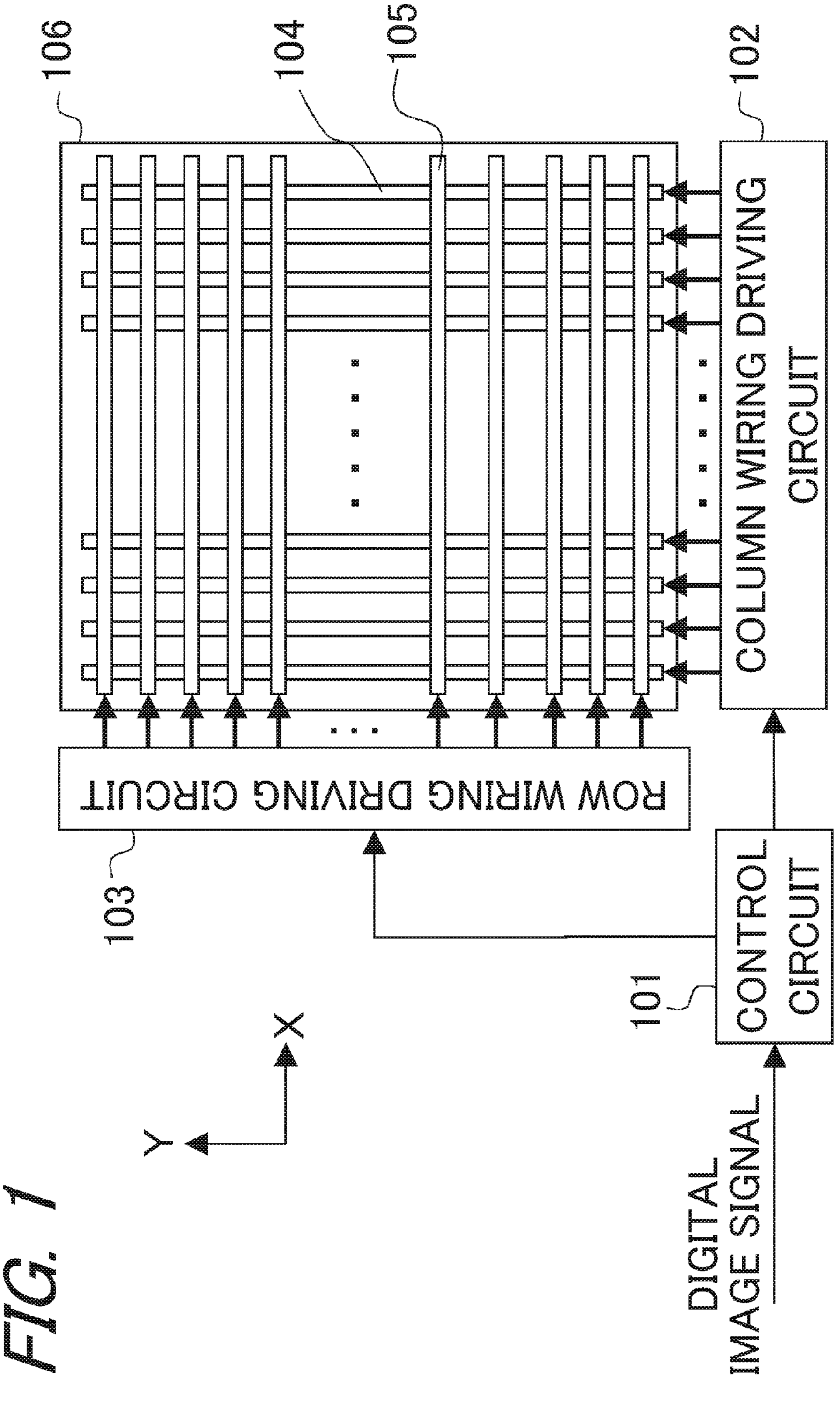
FIG. 1 is a diagram depicting an example of a basic general configuration of a standard FED.
Figure 2A:
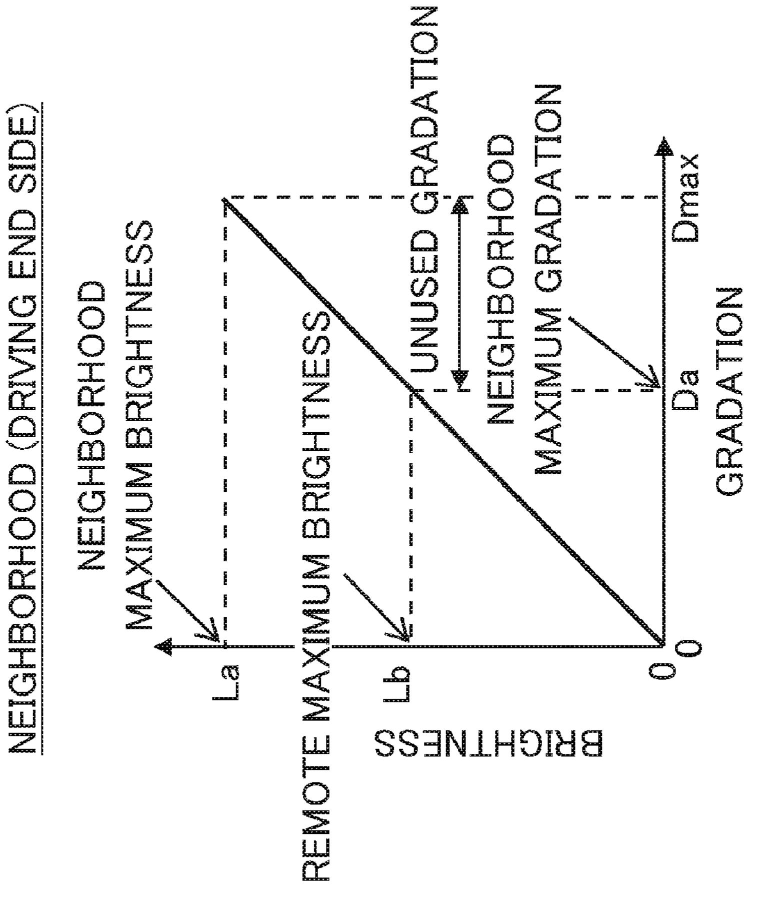
FIG. 2A and FIG. 2B are graphs for describing problems which the present invention is to solve.
Figure 2B:
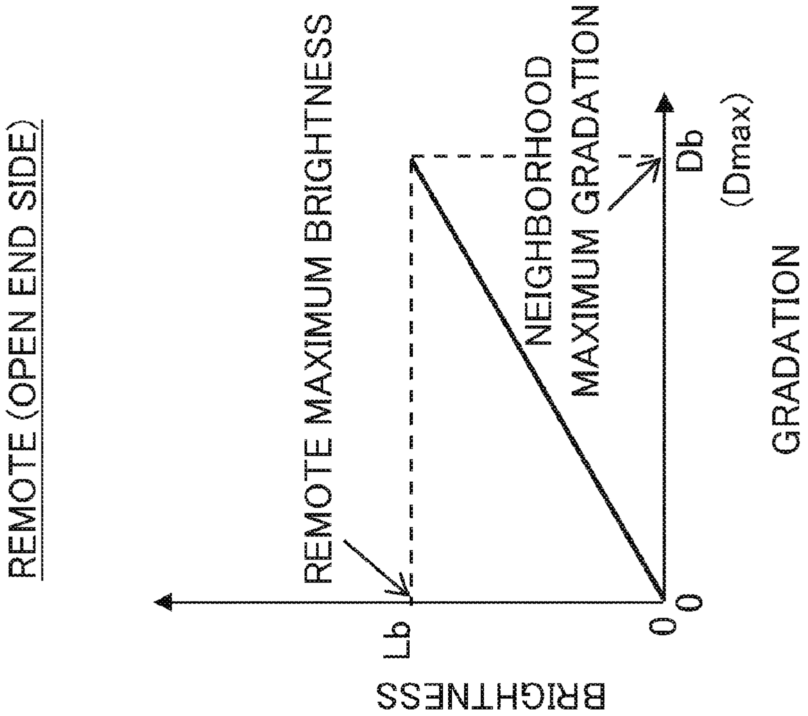

FIG. 1 is an example of a basic general configuration of a standard FED. A rear substrate 106 is a glass substrate constituting a cathode panel of an FED panel (display panel). A plurality of column wirings 104 and a plurality of row wirings 105 are formed on the rear substrate 106 in a matrix. A pixel (display device) is formed on each intersection of the column wirings 104 and the row wirings 105. An anode panel having phosphor and an anode electrode (metal back) is disposed so as to face the cathode panel, although the anode panel is not illustrated. The column wirings 104 are connected to a column wiring driving circuit 102 which outputs modulation signals. The row wirings 105 are connected to a row wiring driving circuit 103 which outputs scanning signals. Each driving circuit 102 and 103 is connected to a control circuit 101, which outputs a horizontal synchronization signal, vertical synchronization signal and a brightness signal (image data). The brightness signal is a digital signal having each color of R, G and B. The control circuit 101 generates a brightness signal from an image signal (digital image signal) which is input, and supplies the brightness signal to the column wiring driving circuit 102. The horizontal synchronization signal and the vertical synchronization signal are input to each driving circuit 102 and 103, and a timing, to apply the scanning signal and the modulation signal, are controlled according to the horizontal synchronization signal and the vertical synchronization signal.

The FED module is constituted by the above composing elements. If the column wiring is formed by a superconductor and does not have wiring resistance, a drop in voltage and rounding of a waveform due to the RC time constant, is not generated, hence an effect is not implemented even if the present invention is applied. In the case of a general wiring material having wiring resistance, such as Al, Cu and Ag, brightness unevenness caused by the wiring resistance of the column lines (a voltage drop due to the wiring resistance of the column wirings and rounding of waveform due to the RC time constant) is generated, hence the present invention can be effectively applied.

(Configuration of Driving Circuit)

Each driving circuit and a gradation representation method will be described next.

First each driving circuit will be described.

The row wiring driving circuit 103 sequentially selects the row wirings 105, and outputs a scanning signal (selection voltage) to the selected row wirings. The row wiring driving circuit 103 applies −20V selection voltage to the driving target row wirings 105 (selected row wirings 105), and 7V non-selection voltage to the other row wirings 105.

Synchronizing with the output of the scanning signal (change of the row wirings selected by the row wiring driving circuit 103), the column wiring driving circuit 102 outputs a modulation signal of each column generated based on the image data (brightness signal) to a plurality of column wirings 104. For example, the column wiring driving circuit 102 is comprised of a shift register which inputs brightness signals for one line (for one horizontal period), a line memory which holds the brightness signals for one line time, and a modulation signal generation unit which generates a driving waveform (modulation signal) Vx according to the brightness signal, and applies the driving waveform Vx to the column wiring. For the modulation signal, a voltage waveform generated by modulating a pulse width and/or amplitude can be used.

Figure 3:
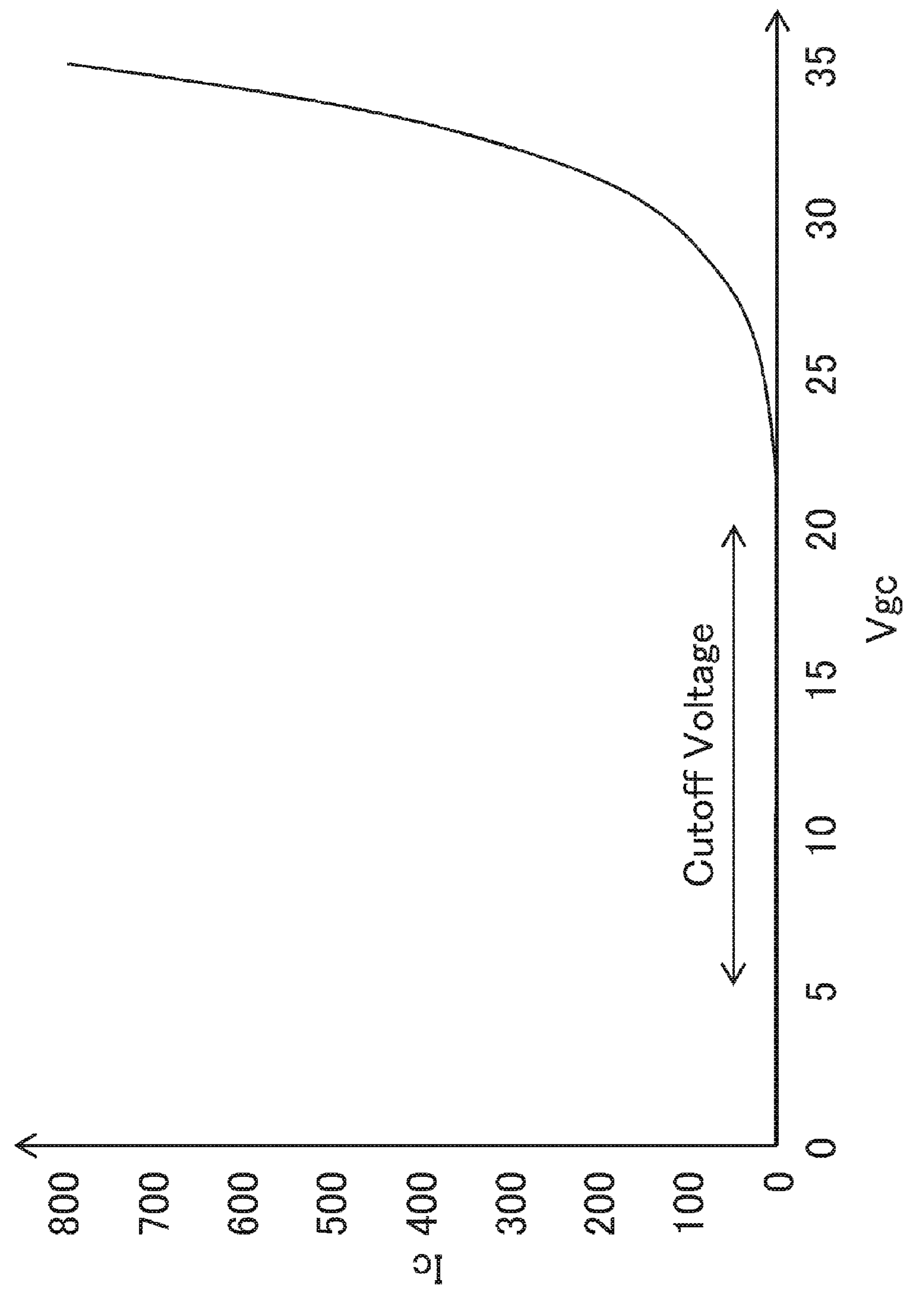
FIG. 3 is a graph depicting an example of electron emission characteristics.

Now the gradation representation method will be described, assuming that the electron emitting device has electron emission characteristics (relationship of the applied voltage Vgc and the electron emitting current Ic of the electron emitting device), as shown in FIG. 3. In concrete terms, in the case of the example in FIG. 3, the electron emitting device has a characteristic where the electron emitting current Ic increases as the applied voltage Vgc increases when the applied voltage Vgc is greater than 20V. The applied voltage Vgc is a voltage which is applied between the gate electrode and the cathode electrode of the electron emitting device (differential voltage between the scanning signal and the modulation signal). The electron emitting current Ic is a current which flows by the electrons emitted from the electron emitting device, that is, the amount of electrons which is emitted from the electron emitting device.

In the case of an electron emitting device which is connected to a row wiring (selected row wiring) where the selection signal (−20V) is applied and a column wiring where the 15V modulation signal is applied, the applied voltage Vgc is 35V. Therefore electrons are emitted from this electron emitting device, and the corresponding phosphor emits light. At this time, a non-selection signal (7V) is applied to other row wirings (non-selected row wirings), and the applied voltage Vgc is 8V in an electron emitting device which is connected to such a row wiring and a column wiring where a 15V modulation signal is applied. Therefore electrons are not emitted, and the corresponding phosphor does not emit light.

In the case of an electron emitting device which is connected to a row wiring where the selection signal is applied and a column wiring where the 0V modulation signal is applied, the applied voltage Vgc is 20V, but since the electron emitting device has the characteristics shown in FIG. 3, electrons are not emitted, and the corresponding phosphor does not emit light. At this time, anon-selection signal is applied to other row wirings, but in the case of an electron emitting device which is connected to such a row wiring and a column wiring where the 0V modulation signal is applied, the applied voltage Vgc becomes −7V, therefore electrons are not emitted, and the corresponding phosphor does not emit light.

By controlling the modulation signal according to the level of the brightness signal (in a 0 to 15V range) like this, the display device connected to the selected row wiring can be driven at a desired gradation level, without driving the display devices connected to non-selected row wiring.

The above description is related to the case of modulating the amplitude of the modulation signal (voltage waveform) according to the brightness signal, but a desired representation can also be performed by modulating the pulse width of the modulation signal, or by modulating both the amplitude and the pulse width, according to the brightness signal.

The present invention can be applied regardless the driving system, such as active matrix driving and passive matrix driving, or regardless the modulation system, such as pulse width modulation (PWM) and pulse height modulation (PHM). Particularly in the case of passive matrix driving, brightness unevenness is generated easily since rounding of the waveform of the modulation signal is directly reflected in the brightness. In PWM, brightness unevenness is easily generated since the influence of rounding of the waveform increases relatively when the pulse width is narrow, compared with the case when the pulse width is wide. Therefore the present invention can be effectively applied to a passive matrix driving type or PWM type image display apparatus. The present invention can also be applied effectively in the case when the wiring resistance of the column wirings and the current that flows in the column wirings are high, and the capacity generated in the intersections of the column wirings and the row wirings is high, because the drop in the voltage of the modulation signal and the rounding of a waveform due to RC time constant appear most conspicuously.

<First Embodiment>

An image display apparatus according to a first embodiment of the present invention and a control method thereof will be described with reference to the drawings.

Figure 4:
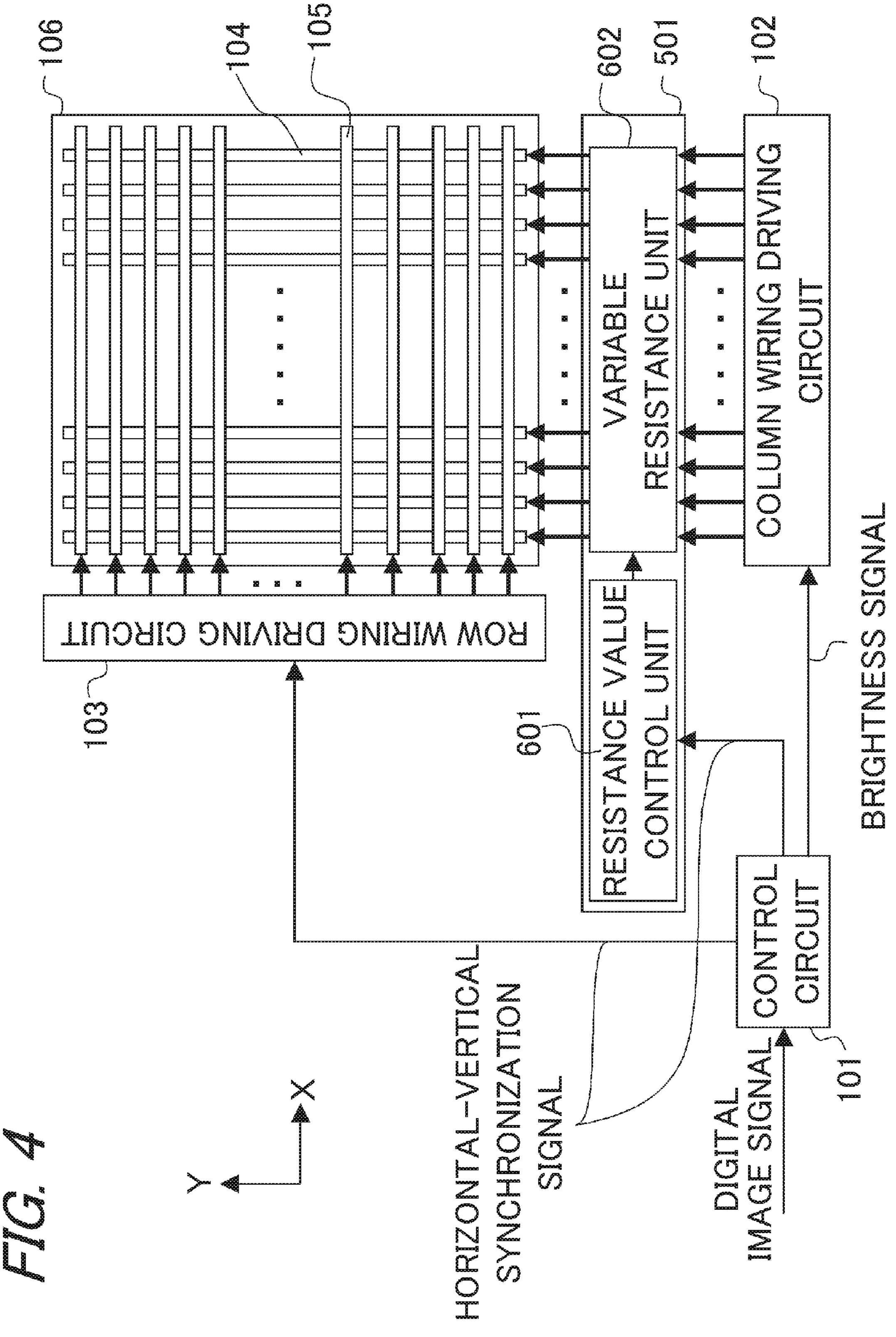
FIG. 4 is a diagram depicting an example of the general configuration of an image display apparatus according to the first embodiment.

As FIG. 4 shows, the image display apparatus according to the present embodiment further comprises a variable resistance circuit 501 which dynamically changes a resistance values between the column wiring driving circuit 102 and the column wirings 104, in addition to a general configuration of the prior art (configuration in FIG. 1).

The variable resistance circuit 501 changes the resistance values between the column wiring driving circuit 102 and the column wirings 104, synchronizing with the change of the row wirings 105 selected by the row wiring driving circuit 103.

The other configuration is the same as FIG. 1, therefore the same reference numerals are used, and description thereof is omitted.

As FIG. 4 shows, the variable resistance circuit 501 can be constituted by a resistance value control unit 601 and a variable resistance unit 602.

The resistance value control unit 601 outputs a control signal to the variable resistance unit 602.

The variable resistance unit 602 is a resistor to be a resistance between the column wiring driving circuit 102 and the column wirings 104, and the resistance values are changed according to the control signal.

The resistance value control unit 601 determines the selected (driven) row wirings (driving lines) using the horizontal synchronization signal and the vertical synchronization signal which are output from the control circuit 101, and changes the control voltage according to the position of the driving line, whereby the resistance values of the variable resistance unit 602 are changed. In other words, the output impedance of the column wiring driving circuit 102 and the resistance values on the display device side, viewed from the column wiring driving circuit 102, are changed.

The resistance value control unit 601 and the variable resistance unit 602 may be disposed in the column wiring driving circuit 102, or in the rear substrate 106. All that is required is that the variable resistance unit 602 is disposed between the column wiring driving circuit 102 and the column wirings 104. The resistance value control unit 601 may be disposed in the control circuit 101.

(Description of the Resistance Value Control Unit)

Figure 5:
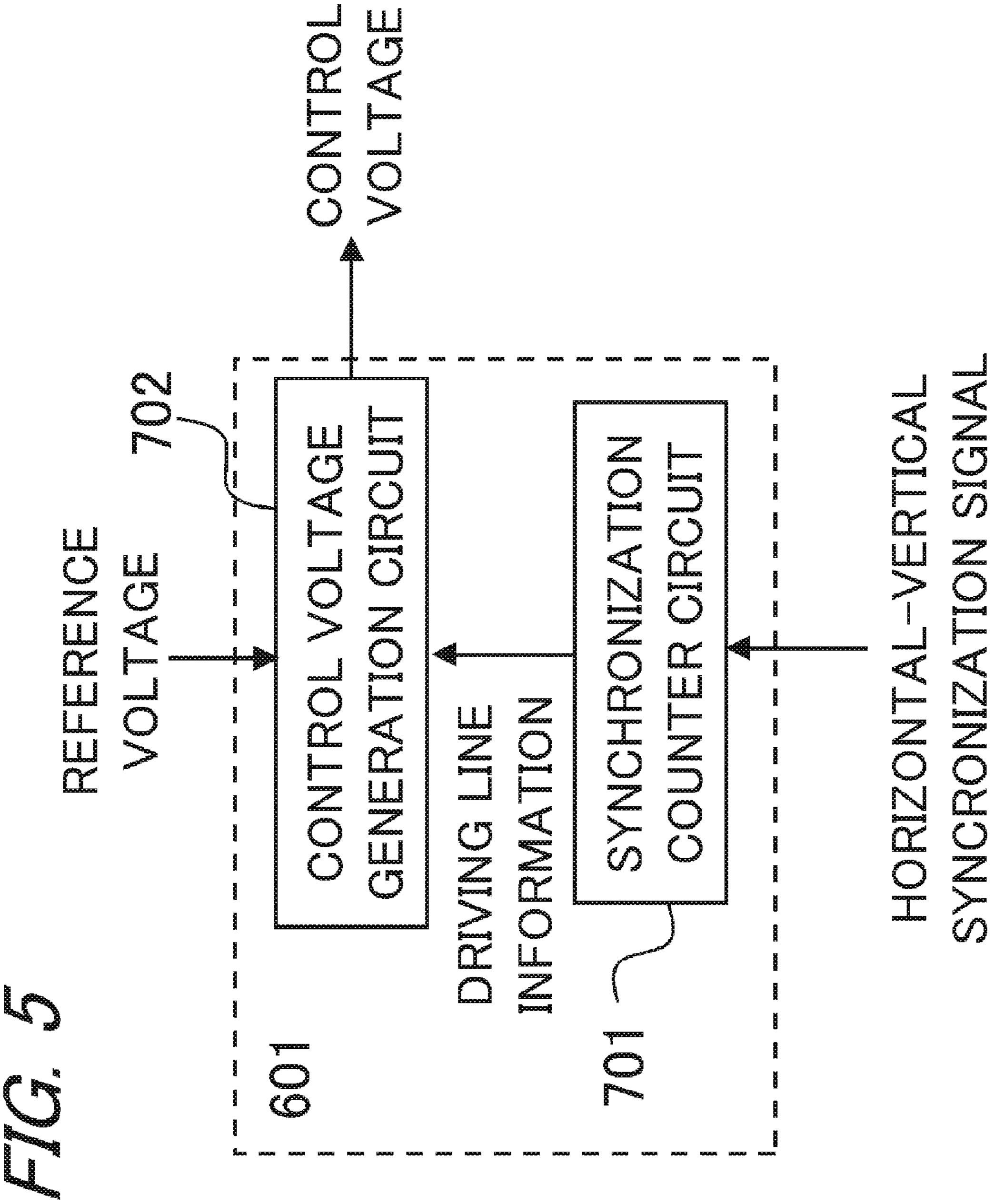
FIG. 5 is a diagram depicting an example of the configuration of a resistance value control unit.

The resistance value control unit 601 will be described with reference to FIG. 5. The resistance value control unit 601 is constituted by a synchronization counter circuit 701 and a control voltage generation circuit 702 among others.

The synchronization counter circuit 701 generates information to indicate driving lines (row wiring numbers) based on the horizontal synchronization signal and the vertical synchronization signal which are sent from the control circuit 101, and outputs the information to the control voltage generation circuit 702.

The control voltage generation circuit 702 outputs the control voltage according to the driving line information which is received.

Figure 6:
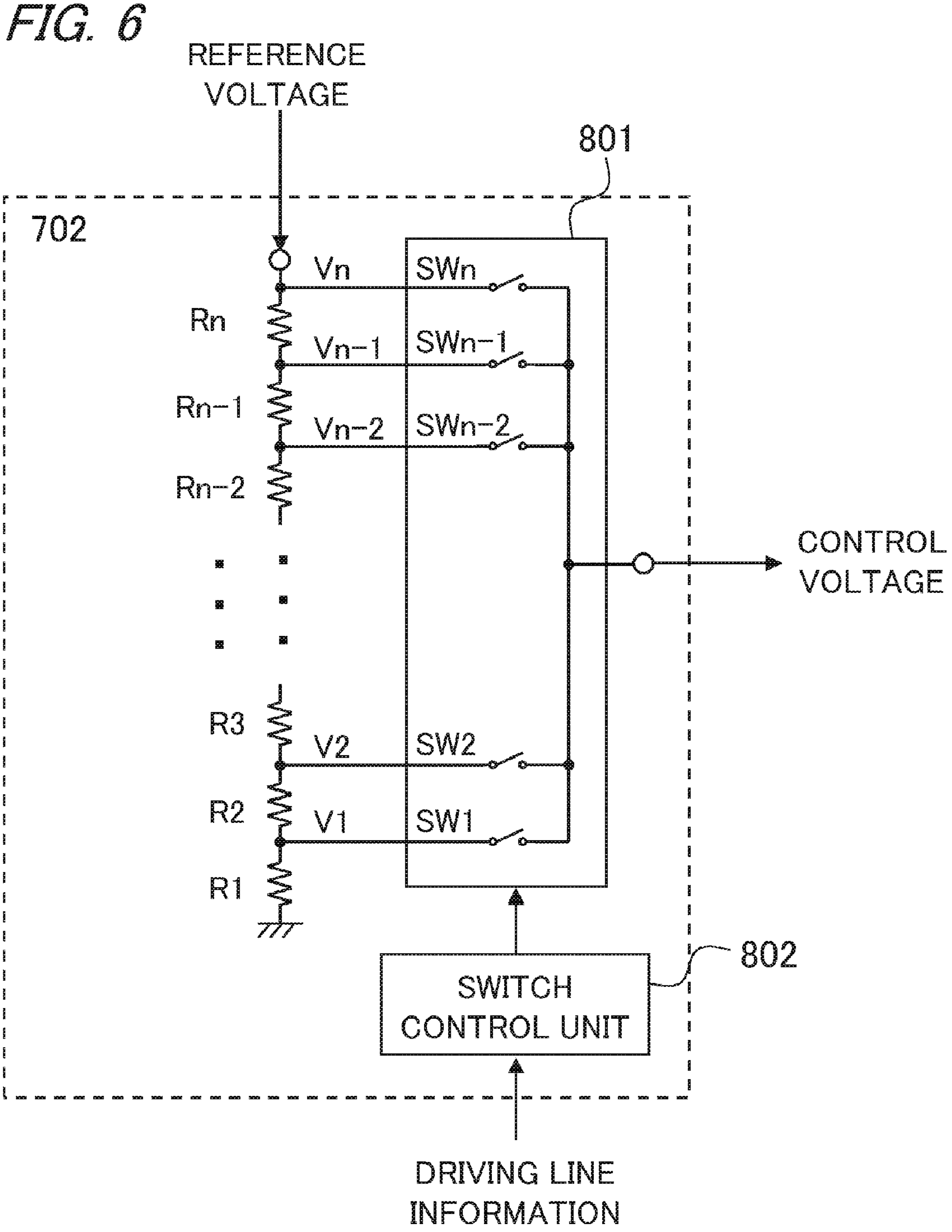
FIG. 6 is a diagram depicting an example of the configuration of a control voltage generation circuit according to the first embodiment.

The control voltage generation circuit 702 can be constituted by a ladder resistance circuit for dividing the reference voltage which is input, as shown in FIG. 6, for example. According to the example in FIG. 6, the control voltage generation circuit 702 has ladder resistors R1 to Rn (n is an arbitrary integer) which are connected in series, a switch group 801, and a switch control unit 802. The reference voltage is applied to all of the plurality of ladder resistors R1 to Rn, and one of voltage V1 to voltage Vn generated by dividing the reference voltage by the plurality of ladder resistors R1 to Rn is selected by the switch group 801 as the control voltage. The switch control unit 802 controls the switch group 801 (which voltage is used as the control voltage) according to the driving line information (positions of the selected row wirings 105).

FIG. 10A to FIG. 10E show examples of the output characteristics of the control voltage (relationship of the selected row wirings and the control voltage). FIG. 11A to FIG. 11C show examples of the switch control characteristics (relationship of the selected row wirings and the selected switch (switch to be turned ON)). FIG. 10A to FIG. 10E and FIG. 11A to FIG. 11C are examples when the row wiring number of the row wiring 105, which is most distant from the column wiring driving circuit 102, is 1, and the row wiring number increases by 1, as the position of the row wiring 105 becomes closer to the column wiring driving circuit 102 (maximum value of the row wiring number is n).

Figure 10A:
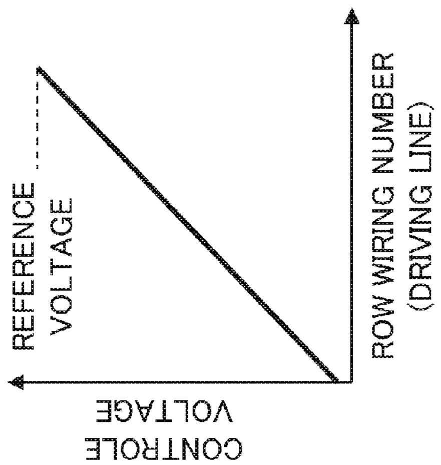
FIG. 10A to FIG. 10E are graphs showing examples of output characteristics of the control voltage.
Figure 11A:
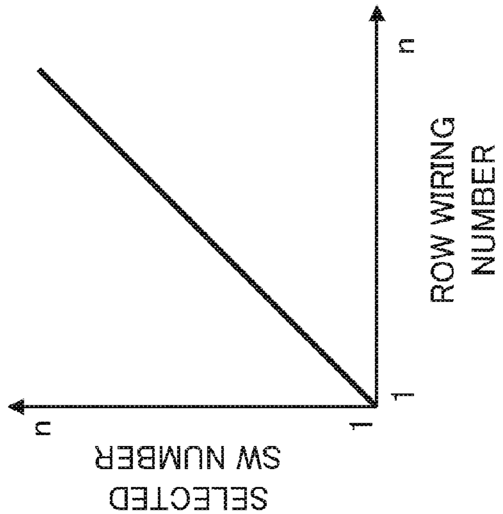
FIG. 11A to FIG. 11C are graphs showing examples of switch control characteristics.
Figure 11B:
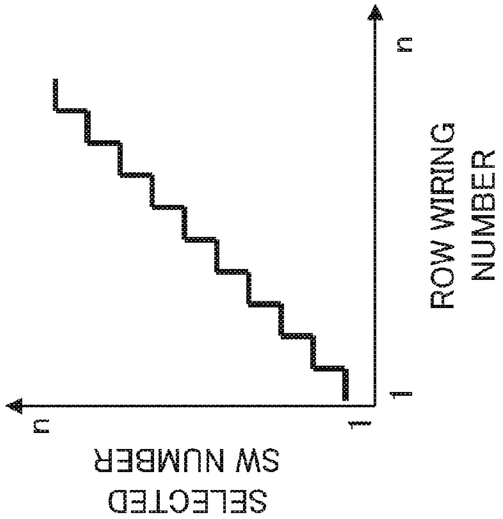
Figure 11C:
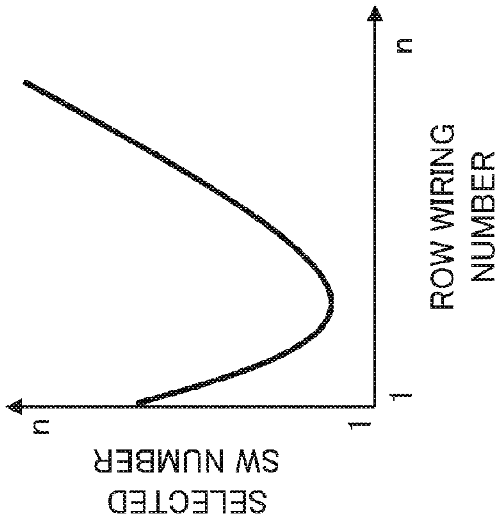

FIG. 10A is an example when the control voltage is increased at a predetermined inclination with respect to the increase in the row wiring number. In order to obtain these characteristics, all the resistance values of the ladder resistors R1 to Rn, shown in FIG. 6, are set the same. If the row wiring number of the driving line is 1, SW1 is turned ON, if the row wiring number is 2, SW2 is turned ON, and if the row wiring number is n, SWn is turned ON (a switch to be turned ON is switched each time a row wiring is selected). In other words, the switch control unit 802 controls the switch group 801 so that the characteristics becomes as shown in FIG. 11A.

Figure 10B:
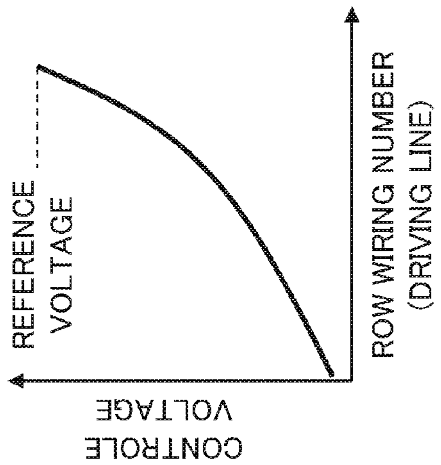
Figure 10C:
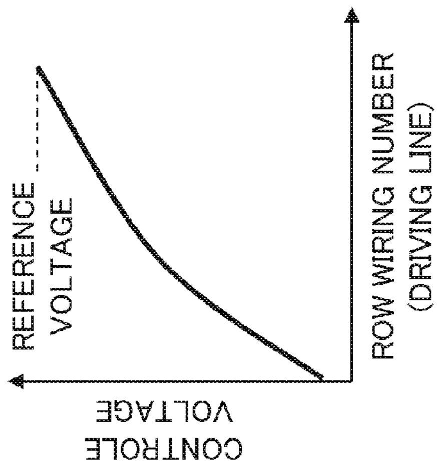

If the resistance values of the ladder resistors are set to be uneven, or if the control characteristics of the switch control unit 802 are changed, the output characteristics shown in FIG. 10B and FIG. 10C can be obtained.

If the control voltage is changed as shown in FIG. 10A to FIG. 10C, the resistance values between the column wiring driving circuit 102 and the column wirings 104 can be changed continuously according to the positions of the selected row wirings.

Figure 10D:
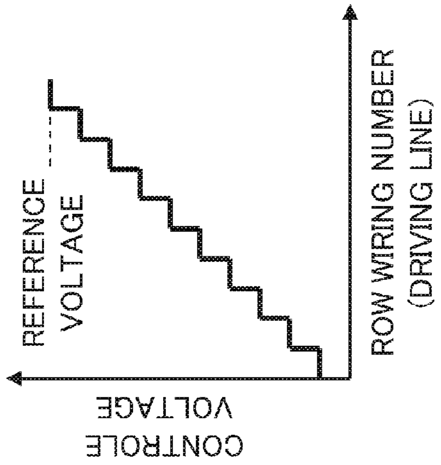

The configuration of the variable resistance circuit 501, however, is not limited to this. All that is required is that the variable resistance circuit 501 is designed in an optimum way so that the desired change of resistance values can be implemented based on the resistance values of the column wirings 104 and distribution thereof. Hence types and number of control signals, a number of switches and control method for the switches, and detailed characteristics thereof are not especially limited. In concrete terms, the control signal may be a current value, or a plurality of types of signals (e.g. both voltage value and current value). The variable resistance circuit 501 may stepwise change the resistance values between the column wiring driving circuit 102 and the column wirings 104 according to the positions of the selected row wirings. In concrete terms, the output characteristics of the control voltage may have a configuration to change the control voltage every time row wirings are selected a plurality of times, as shown in FIG. 10D. In order to obtain the characteristics shown in FIG. 10D, the switch control unit 802 can control the switch group 801 so that the characteristics becomes as shown in FIG. 11B. In other words, switches to be turned ON is changed every time the row wirings are selected for a plurality of times. If this configuration is used, the circuit configuration and processing (selecting of switches) can be simplified compared with the case of obtaining the control voltage as shown in FIG. 10A to FIG. 10C.

(Description of Variable Resistance Unit)

The variable resistance unit 602 will be described with reference to FIG. 7. In the case of the example in FIG. 7, the variable resistance unit 602 is constituted by a circuit including a field effect transistor (FET) for each column wiring 104. FET is an element to be a resistance between the column wiring driving circuit 102 and the column wirings 104.

A drain terminal of the FET is connected to the column wiring 104, and a source terminal is connected to the column wiring driving circuit 102, and the control voltage is input to a gate terminal. Therefore a resistance value of the FET (current which flows between the drain and the source (between input and output of the variable resistance unit)) is set according to the voltage difference between the modulation signal and the control voltage.

If the modulation signal has a voltage waveform of which amplitude has been modulated, it is possible that the resistance value of the FET could be changed by the modulation signal. In other words, it is possible that a difference is generated in the resistance values of FETs among the column wirings. Therefore if the modulation signal has a voltage waveform of which amplitude has been modulated, the control voltage to be input is changed for each FET.

Figure 7:
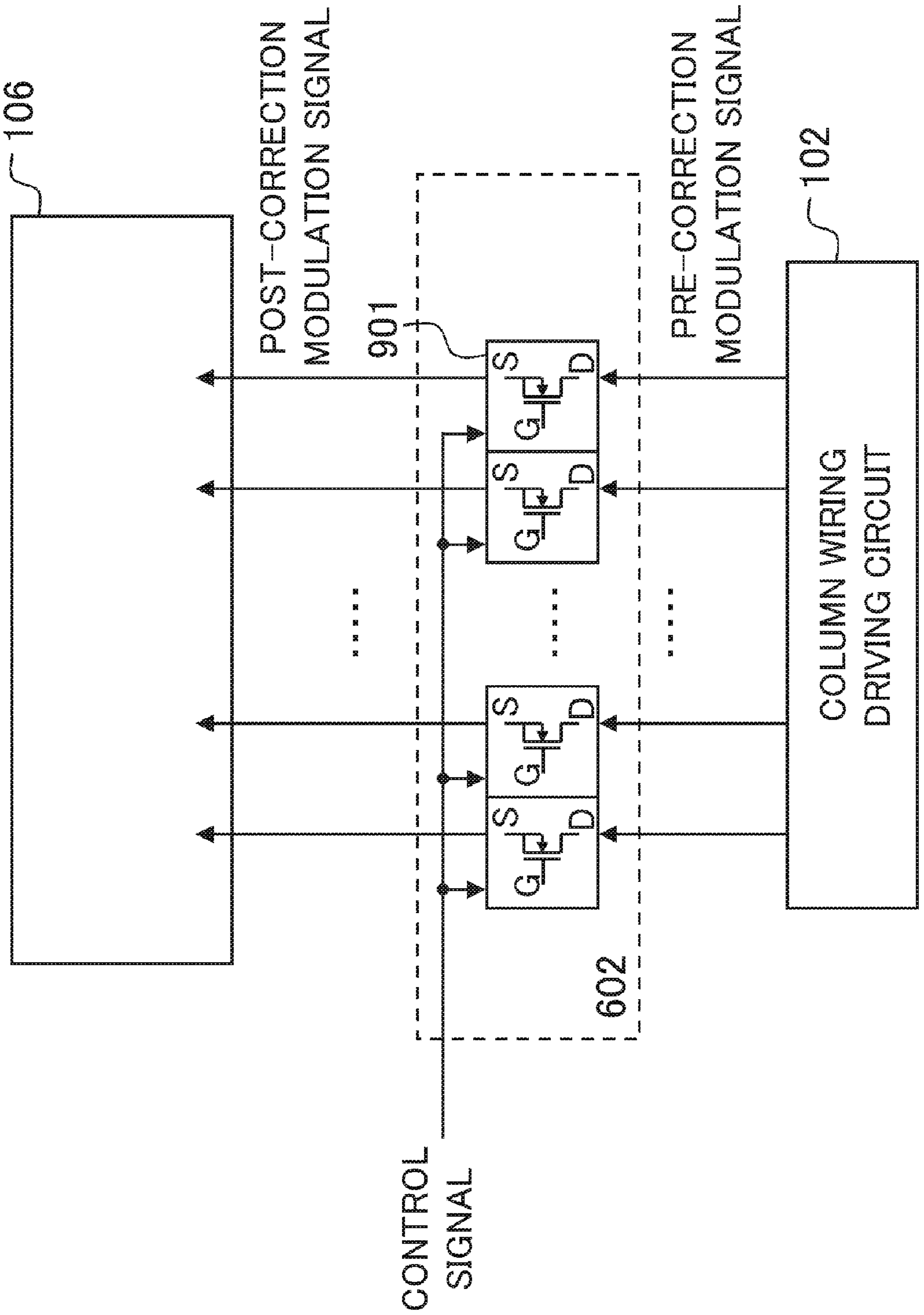
FIG. 7 is a diagram depicting an example of the configuration of a variable resistance unit.

In FIG. 7, one FET is disposed for one column wiring, but a plurality of FETs maybe disposed for one column wiring. In this case, a value of the control voltage to be input may be different for each FET. A semiconductor device, such as various types of transistors, may be used instead of an FET. In this case, not voltage but current may be input.

According to the present embodiment, the variable resistance circuit 501 changes the resistance values (resistance values of FETs) between the column wiring driving circuit 102 and the column wirings 104 according to the positions of the selected row wirings 105. In concrete terms, in order to control the brightness unevenness caused by the wiring resistance of the column wirings, the resistance value of an FET is higher when the selected row wiring 105 is close to the column wiring driving circuit 102 than when the selected row wirings 105 is distant from the column wiring driving circuit 102. Specifically, the resistance values of the FETs are changed so that the resistance value between a pixel connected to the selected row wiring 105 and the column wiring driving circuit 102 becomes constant, regardless the position of the selected row wiring 105. Thereby the variable resistance circuit 501 controls fluctuation of the resistance value between the pixel connected to the selected row wiring 105 and the column wiring driving circuit 102.

Waveforms of the modulation signal (modulation signal to be applied to a pixel connected to a selected row wiring (pixel to be driven)) according to the present embodiment will be described with reference to FIG. 12 and FIG. 13.

Figure 12:
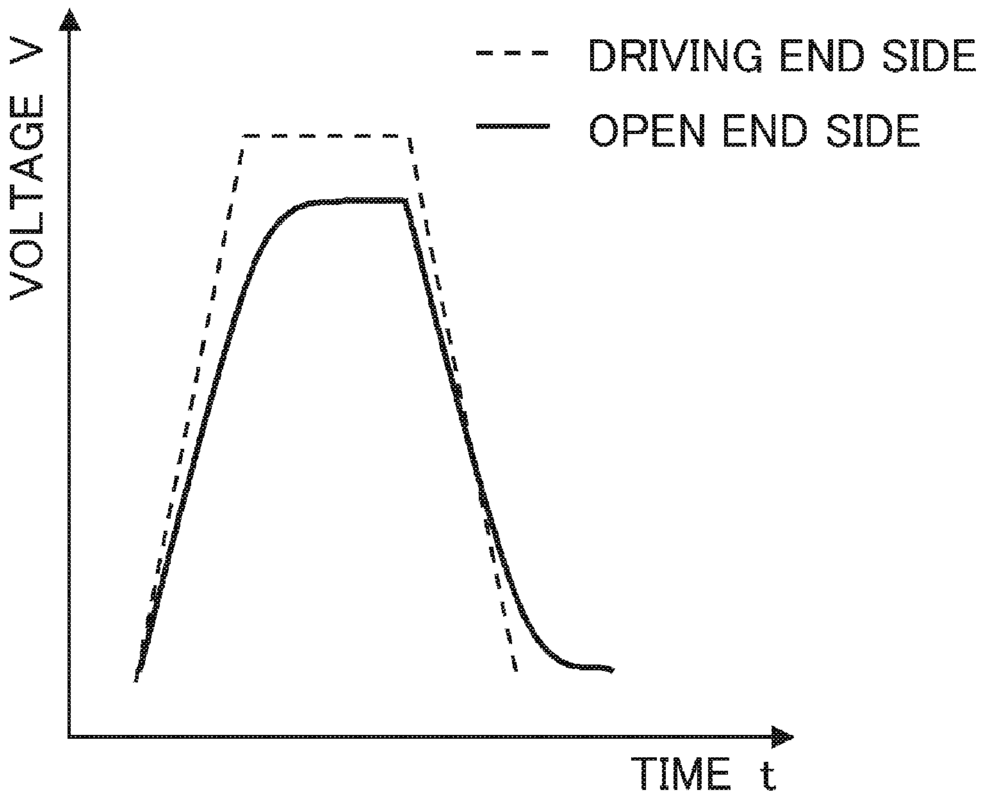
FIG. 12 is a graph showing an example of a waveform of a conventional modulation signal.

If a row wiring on the open end side, which is distant from the column wiring driving circuit 102, is selected, the resistance value of the FET becomes a low value, therefore the modulation signal that is applied to the pixel to be driven is approximately the same as the conventional signal (solid line in FIG. 12).

If a row wiring on the driving end side, which is near the column wiring driving circuit 102, is selected, on the other hand, the resistance value of the FET becomes a high value. Therefore the modulation signal that is applied to the pixel to be driven is greatly influenced by the drop in voltage due to the FET and rounding of the waveform due to the RC time constant. As a result, the modulation signal which is applied to the pixel to be driven becomes close to the modulation signal on the open end side (solid line in FIG. 12), as shown in the solid line in FIG. 13. In this case, the image data remains having the same gradation (the gradation value of the image data is not changed). In other words, according to the configuration of the present embodiment, the modulation signal on the driving end side and the modulation signal on the open end side can be similar without dropping the gradation value (gradation of an image), and as a result, brightness unevenness caused by the wiring resistance of the column wirings can be controlled.

Figure 13:
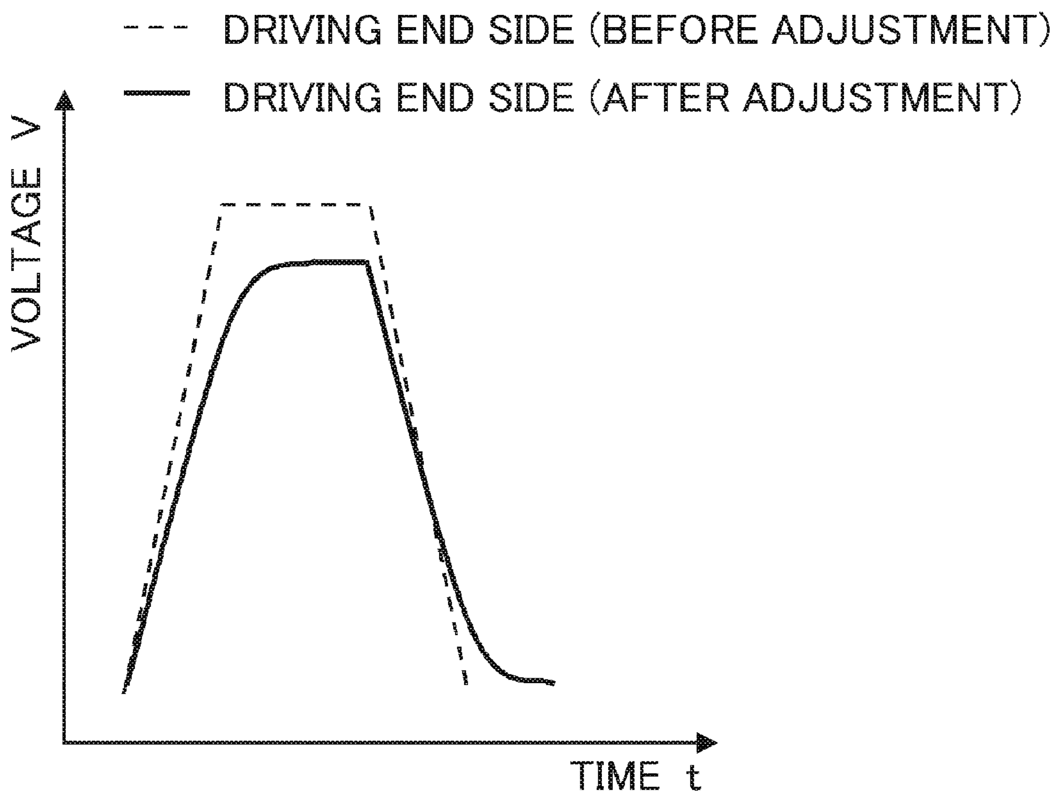
FIG. 13 is a graph depicting an example of a waveform of a modulation signal according to the present embodiment.

In FIG. 13, the conventional signal is indicated by the dotted line.

As described above, according to the present embodiment, brightness unevenness caused by the wiring resistance of the column wirings can be controlled without dropping the gradation of an image, using a simple configuration of changing the resistance values between the column wiring driving circuit and the column wirings according to the position of the selected row wiring. In concrete terms, the brightness unevenness caused by the wiring resistance of the column wirings can be controlled without dropping the gradation of an image by setting a resistance value between the column wiring driving circuit and the column wiring to be higher when the selected row wiring is close to the column wiring driving circuit than when the selected row wiring is distant from the column wiring driving circuit.

<Second Embodiment>

In the second embodiment, the configuration of the control voltage generation circuit 702 is different from the first embodiment. In the second embodiment, description is omitted for a configuration the same as the first embodiment, and only aspects that are different from the first embodiment will be described.

Figure 8:
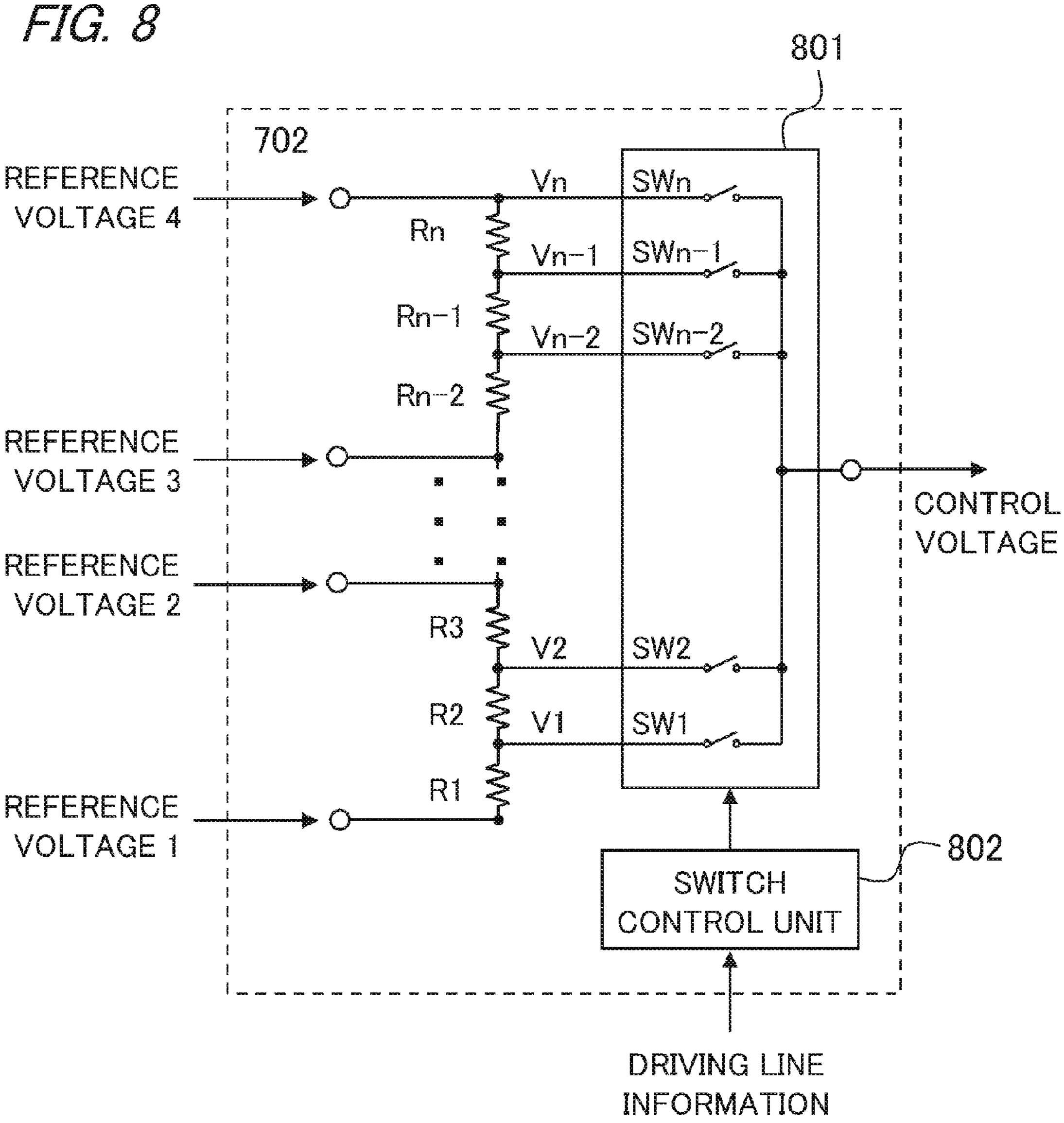
FIG. 8 is a diagram depicting an example of the configuration of a control voltage generation circuit according to the second embodiment.
Figure 10E:
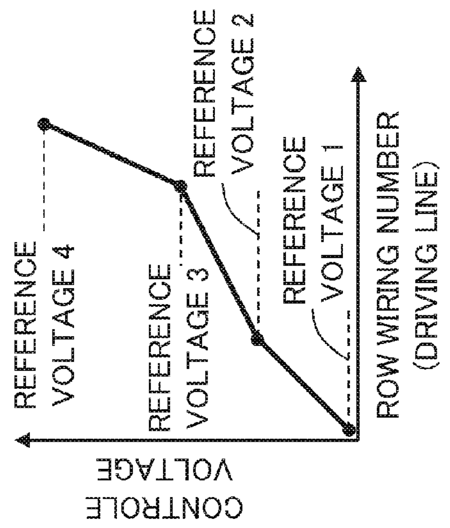

In the control voltage generation circuit 702 according to the present embodiment, the ladder resistance circuit can input a reference voltage value for specifying a potential at the endpoint of the ladder resistance circuit, and a reference voltage value for specifying a potential at an intermediate point. In concrete terms, as FIG. 8 shows, four reference voltage values (reference voltage 1<reference voltage 2<reference voltage 3<reference voltage 4) are input to arbitrary positions of a plurality of ladder resistors. Therefore the output characteristics of the control voltage can be changed for each area (a plurality of row wirings) on the screen according to the reference voltage values 1 to 4. FIG. 10E is a case when the resistance values of the ladder resistors are the same. In this case, the inclination of the output characteristics can be changed depending on the area of the screen. A number of reference voltage values is not limited to four (all that is required is that two or more reference voltage values are input).

If a number of the reference voltage values is 1, the output characteristics of the control voltage can be changed only in the state of maintaining the ratio of the voltage values V1 to Vn, that is, in the state of maintaining the curving form of the output characteristics of the control voltage, even if the reference voltage value is changed. For example, in the case of the control voltage generation circuit having the output characteristics in FIG. 10A, where all the ladder resistance values are the same, the inclination can be changed only uniformly, and the output characteristics shown in FIG. 10E cannot be obtained.

Even in the case of the first embodiment where a number of reference voltage values is 1, various output characteristics of the control voltage, including FIG. 10E, could be implemented if the resistance values of the ladder resistors could be changed. However the resistance values cannot be changed easily since the ladder resistors are normally formed in such a custom component as an IC. Even if the change were possible, redesigning components may be required.

As described above, according to the present embodiment, the ladder resistance circuit is constructed such that a reference voltage value for specifying the potential at the end point of the ladder resistance circuit and a reference voltage value for specifying the potential at an intermediate point can be input. The effect obtained from this configuration is that the output characteristics of the control voltage can be changed without changing the control voltage generation circuit 702. Furthermore various output characteristics of the control voltage can be obtained using a same variable resistance circuit 501, and as a result, various characteristics of the change of resistance values (relationship of the driving lines and resistance values) can be obtained. A case when the resistance values of the column wirings 104 and distribution thereof are changed can also be handled, which is very desirable.

<Third Embodiment>

In the third embodiment, the configuration of the control voltage generation circuit is different from the first embodiment. In the third embodiment, description is omitted for a configuration the same as the first embodiment, and only aspects that are different from the first embodiment will be described.

Figure 9:
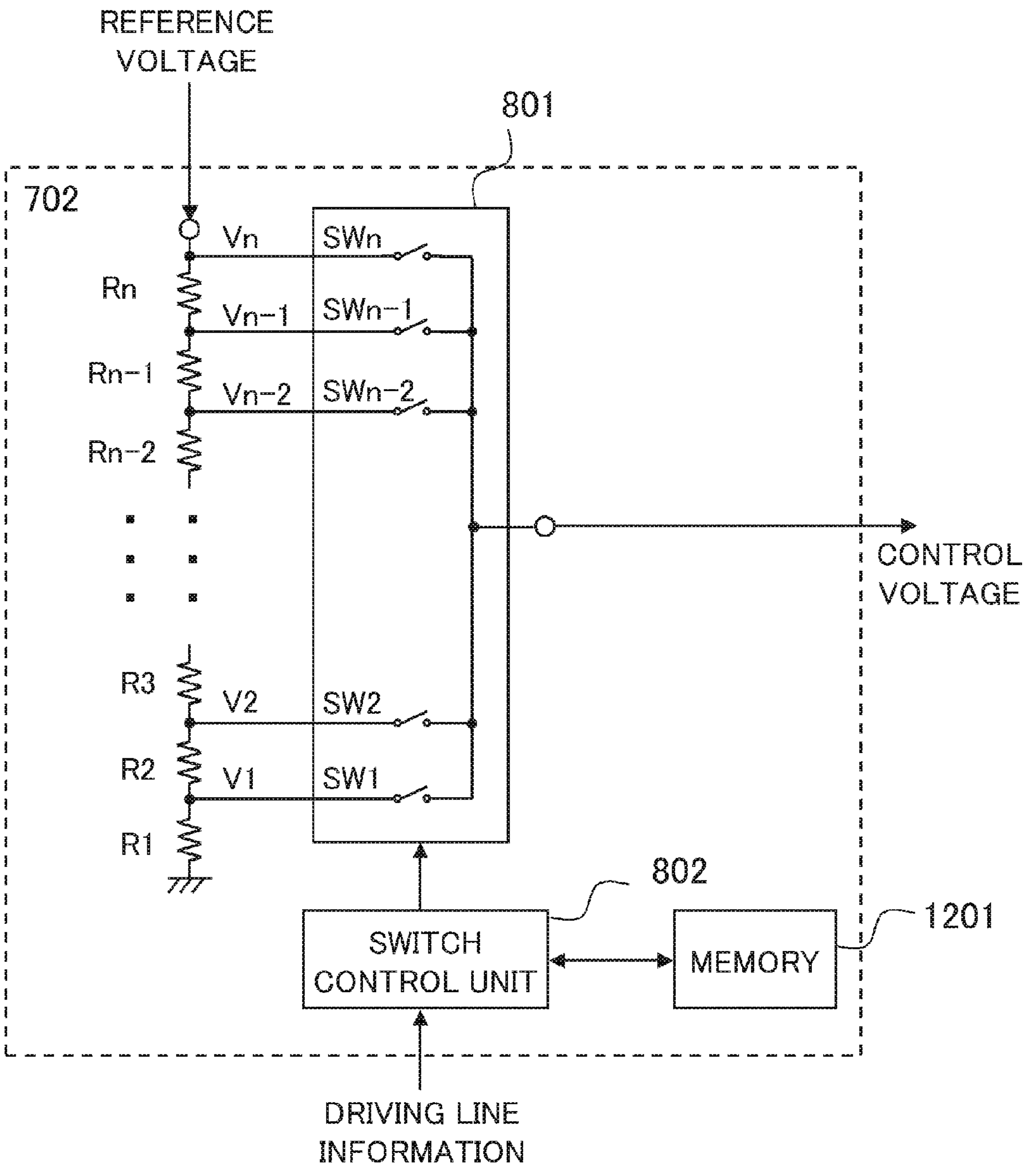
FIG. 9 is a diagram depicting an example of the configuration of a control voltage generation circuit according to the third embodiment.

The control voltage generation circuit 702 according to the present embodiment has a memory 1201 connected to a switch control unit 802, as shown in FIG. 9.

In the memory 1201, a one-dimensional lookup table data, which indicates the relationship of the row wiring numbers (driving line information) and the selected switch numbers, as shown in FIG. 11A to FIG. 11C, is stored. The switch control unit 802 reads the selected switch numbers, corresponding to the driving line information which is input, from the memory 1201, and controls the switch group 801.

Then the output characteristics of the control voltage can be changed by overwriting the one-dimensional lookup table data.

Even in the case of the first embodiment, the output characteristics of the control voltage could be changed if the switch group 801 or the switch control unit 802 is changed. However, the configurations of the switch group 801 and the switch control unit 802, which are normally formed in such a custom component as an IC, cannot be easily changed. Even if the change were possible, redesigning components may be required.

As described above, according to the present embodiment, a memory, where the one-dimensional lookup table data showing the relationship of the row wiring numbers and the selected switch numbers is stored, is disposed, and the switch group is controlled using this one-dimensional lookup table data. Thereby the output characteristics of the control voltage can be changed without changing the switch group 801 and the switch control unit 802. In concrete terms, the output characteristics of the control voltage can be easily changed by overwriting the one-dimensional lookup table data. Hence, various output characteristics of the control voltage can be obtained using a same variable resistance circuit 501, and as a result, various characteristics of the change of the resistance values (relationship of the driving lines and resistance values) can be obtained. A case when the resistance values of the column wirings 104 and distribution thereof are changed can also be handled, which is very desirable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-235521, filed on Oct. 20, 2010, which is hereby incorporated by reference herein in its entirety.

What is claimed is:

1. An image display apparatus, comprising:

a display panel having a plurality of row wirings, a plurality of column wirings, and a plurality of pixels disposed on each intersection of the row wirings and the column wirings;

a row wiring driving circuit which sequentially selects the row wirings and outputs a scanning signal to the selected row wiring;

a column wiring driving circuit which outputs a modulation signal generated based on image data to the plurality of column wirings, in synchronization with the output of the scanning signal; and a variable resistance circuit which dynamically changes resistance values between the column wiring driving circuit and the column wirings, wherein the variable resistance circuit changes the resistance values according to a position of the selected row wiring so that the resistance value becomes higher as the selected row wiring is closer to the column wiring driving circuit.

2. The image display apparatus according to claim 1, wherein the variable resistance circuit changes the resistance values between the column wiring driving circuit and the column wirings, so that the resistance value between a pixel connected to the selected row wiring and the column wiring driving circuit is constant regardless the position of the selected row wiring.

3. The image display apparatus according to claim 1, wherein the variable resistance circuit changes the resistance value stepwise according to the position of the selected row wiring.

4. The image display apparatus according to claim 1, wherein the variable resistance circuit changes the resistance values between the column wiring driving circuit and the column wirings, in synchronization with the output of the scanning signal.

5. The image display apparatus according to claim 1, wherein the variable resistance circuit comprises:

a variable resistance unit which has a field effect transistor which is to be a resistor between the column wiring driving circuit and the column wiring; and a resistance value control unit which outputs control voltage to the variable resistance unit, the resistance value of the field effect transistor is set according to the voltage difference between the modulation signal and the control voltage, and the resistance value control unit changes the control voltage according to the position of the selected row wiring.

6. The image display apparatus according to claim 5, wherein the resistance value control unit is constituted by a ladder resistance circuit which divides a reference voltage that is input.

7. The image display apparatus according to claim 6, wherein the ladder resistance circuit inputs a reference voltage value for specifying potential of an end point of the ladder resistance circuit and a reference voltage value for specifying potential of an intermediate point.

8. A method for controlling an image display apparatus having a display panel having a plurality of row wirings, a plurality of column wirings, a plurality of pixels disposed on each intersection of the row wirings and the column wirings, a row wiring driving circuit, a column driving circuit, and a variable resistance circuit, the method comprising:

a step in which the row wiring driving circuit sequentially selects the row wirings and outputs a scanning signal to the selected row wiring;

a step in which the column wiring driving circuit outputs a modulation signal generated based on image data to the plurality of column wirings, in synchronization with the output of the scanning signal; and a step in which the variable resistance circuit dynamically changes resistance values between the column wiring driving circuit and the column wirings according to a position of the selected row wiring, so that the resistance value becomes higher as the selected row wiring is closer to the column wiring driving circuit.

* * * * *